(12) United States Patent
Lv et al.

(10) Patent No.: US 10,801,924 B2
(45) Date of Patent: Oct. 13, 2020

(54) COMPREHENSIVE PERFORMANCE TEST SYSTEM FOR AUTOMATED DRIVING VEHICLES

(71) Applicant: SHANGHAI DIGAUTO AUTOMOBILE TECHNOLOGY CO., LTD., Shanghai (CN)

(72) Inventors: Jiming Lv, Shanghai (CN); Xinjie Zhang, Shanghai (CN); Xiaoying Li, Shanghai (CN)

(73) Assignee: SHANGHAI DIGAUTO AUTOMOBILE TECHNOLOGY CO., LTD., Shanghai (CN)

( * ) Notice: Subject to any disclaimer, the term of this patent is extended or adjusted under 35 U.S.C. 154(b) by 149 days.

(21) Appl. No.: 16/301,678

(22) PCT Filed: Apr. 13, 2018

(86) PCT No.: PCT/CN2018/083128
§ 371 (c)(1),
(2) Date: Nov. 14, 2018

(87) PCT Pub. No.: WO2018/192427
PCT Pub. Date: Oct. 25, 2018

(65) Prior Publication Data
US 2019/0285514 A1    Sep. 19, 2019

(30) Foreign Application Priority Data
Apr. 18, 2017 (CN) .......................... 2017 1 0252539

(51) Int. Cl.
*G01M 17/06* (2006.01)
*G01M 17/007* (2006.01)
*G01M 17/013* (2006.01)

(52) U.S. Cl.
CPC ........ *G01M 17/065* (2013.01); *G01M 17/007* (2013.01); *G01M 17/013* (2013.01); *G01M 17/06* (2013.01)

(58) Field of Classification Search
CPC .. G01M 17/065; G01M 17/007; G01M 17/06; G01M 17/013
See application file for complete search history.

(56) References Cited

U.S. PATENT DOCUMENTS 5,111,685 A * 5/1992 Langer .............. G01M 17/0074
73/118.01
6,327,526 B1 * 12/2001 Hagan .................. G01M 17/00
701/124

(Continued)

FOREIGN PATENT DOCUMENTS

CN   101776526 A   7/2010
CN   102322797 A   1/2012

(Continued)

*Primary Examiner* — Freddie Kirkland, III
(74) *Attorney, Agent, or Firm* — Rabin & Berdo, P.C.

(57) ABSTRACT

A comprehensive performance test system for Automated Driving Vehicles related to the technical field of vehicle testing equipment. It solves the technical problem of testing Automated Driving Vehicles. The system comprises a base platform, a lateral moving platform mounted on the base platform, and a rotary platform mounted on the lateral moving platform; There are two front wheels' brackets in the front of the rotary platform which can slide left and right, and two front wheel track adjustment mechanisms to control the movement of left and right sliding of two front wheels' brackets; There are two rear wheels' brackets on the rear of the rotary platform which can slide front and back, and two wheelbase adjustment mechanisms to control the movement of front and rear sliding of two rear wheels' brackets. Each front wheel bracket is equipped with a dynamometer bracket which can rotate horizontally, and each front wheel dyna- (Continued)

mometer bracket is equipped with a rotary dynamometer and a motor for driving the rotation of the front wheel dynamometer. Each rear wheel bracket is equipped with a rear wheel rotary dynamometer and a load motor for driving the rotation of the real wheel rotary dynamometer. The system provided by the invention can test the longitudinal and lateral performance of Automated Driving Vehicles.

1 Claim, 3 Drawing Sheets

(56) References Cited

U.S. PATENT DOCUMENTS

| | | | | |
|---|---|---|---|---|
| 6,427,528 | B1 * | 8/2002 | Yamakado | G01M 17/0072 73/121 |
| 7,054,727 | B2 * | 5/2006 | Kemp | G01M 17/007 280/5.5 |
| 7,360,443 | B2 * | 4/2008 | Kerschbaum | G01M 9/062 73/856 |
| 7,841,233 | B2 * | 11/2010 | Cogotti | G01M 9/04 73/147 |
| 8,171,782 | B2 * | 5/2012 | Strobel | G01M 17/0074 73/116.07 |
| 8,607,626 | B2 * | 12/2013 | Litz | G01M 17/007 73/116.07 |
| 8,788,116 | B2 * | 7/2014 | Litz | G05D 1/0238 701/2 |
| 9,442,043 | B2 * | 9/2016 | Tagami | G01M 17/007 |
| 9,442,044 | B2 * | 9/2016 | Tagami | G01M 17/007 |

FOREIGN PATENT DOCUMENTS

| | | |
|---|---|---|
| CN | 103123302 A | 5/2013 |
| CN | 204944848 U | 1/2016 |
| CN | 105424380 A | 3/2016 |
| CN | 105445041 A | 3/2016 |
| CN | 106940258 A | 7/2017 |
| CN | 206695996 U | 12/2017 |
| WO | WO-0186245 A1 | 11/2001 |

* cited by examiner

COMPREHENSIVE PERFORMANCE TEST SYSTEM FOR AUTOMATED DRIVING VEHICLES

TECHNOLOGY FIELD OF THE INVENTION

The present invention relates to the technology of vehicle testing equipment, especially relates to the comprehensive performance testing system for Automated Driving Vehicles.

TECHNOLOGY BACKGROUND OF THE INVENTION

At present, there is only the test-bench for longitudinal performance of vehicle performance test on the market, and the vehicle tests on lateral performance are executed in proving ground. The comprehensive performance tests of the Automated Driving Vehicles takes in 6 DOF (degree of freedom) motion simulators. The longitudinal test-bench, such as chassis dynamometers, can realize the longitudinal performance tests only, and the 6 DOF motion simulators could make the lateral performance tests. But for the Automated Driving Vehicles, both longitudinal and lateral performances are necessary to be tested simultaneously. That's why the laboratory need the essential test-bench besides the road testing in proving ground.

Technical Problem

In order to solve the technical problem mentioned above, the present invention provides a comprehensive performance test system for Automated Driving Vehicles which can execute the longitudinal and lateral performance tests simultaneously.

Solution to the Problem

Technical Solution

In order to solve the technical problem mentioned above, the present invention provides a comprehensive performance test system for Automated Driving Vehicles, comprising: the base platform, a lateral moving platform which is mounted on the base platform and can slide left and right on the base platform, a rotary platform which is mounted on the lateral moving platform and can rotate horizontally.

The base platform as mentioned above is equipped with a guide rail for guiding the left and right sliding of the lateral moving platform, and a motor for driving the left and right sliding of the lateral moving platform.

The lateral moving platform is equipped with a guide rail for guiding the horizontal rotation of the rotary platform and a motor for driving the horizontal rotation of the rotary platform.

There are two front wheels' brackets in the front of the rotary platform, which can slide left and right, and two front wheel track adjustment mechanisms to control the movement of left and right sliding of two front wheels' brackets; There are two rear wheels' brackets on the rear of the rotary platform which can slide front and back, and two wheelbase adjustment mechanisms to control the movement of front and rear sliding of two rear wheels' brackets.

Each front wheel bracket is equipped with a front wheel dynamometer bracket which can rotate horizontally, and each front wheel dynamometer bracket is equipped with a front wheel rotary dynamometer, and a load motor for driving the rotation of the front wheel rotary dynamometer.

Each rear wheel's bracket is equipped with a rear wheel rotary dynamometer, and a load motor for driving the rotation of the rear wheel rotary dynamometer.

Furthermore, the said rotary platform is equipped with a motion platform which can slide up and down. The motion platform is laid between the front wheel rotary dynamometer and the rear wheel rotary dynamometer. There are three actuators on the rotary platform, and the three actuators can drive the motion platform sliding upper and lower. The three actuators are arranged in triangle.

The Beneficial Effects of the Patent Invention

Beneficial Effects

The comprehensive performance test system of Automated Driving Vehicle provided by the present invention can realize the simulation of the movements of: the two degrees of freedom steering of front-wheel, four-wheel driving load, body yaw rotation degree of freedom, body lateral moving degree of freedom simultaneously through the integration of the lateral moving platform, the rotary platform, the front wheel dynamometer bracket and the simulation of the four-wheel load by the dynamo. It can test the longitudinal and lateral performance of Automated Driving Vehicles, and through the front wheel track adjustment mechanism, wheelbase adjustment mechanism, different types of vehicles can be tested.

A BRIEF DESCRIPTION OF FIGURES

THE BEST EMBODIMENT OF THE PATENT INVENTION

Figure 1:
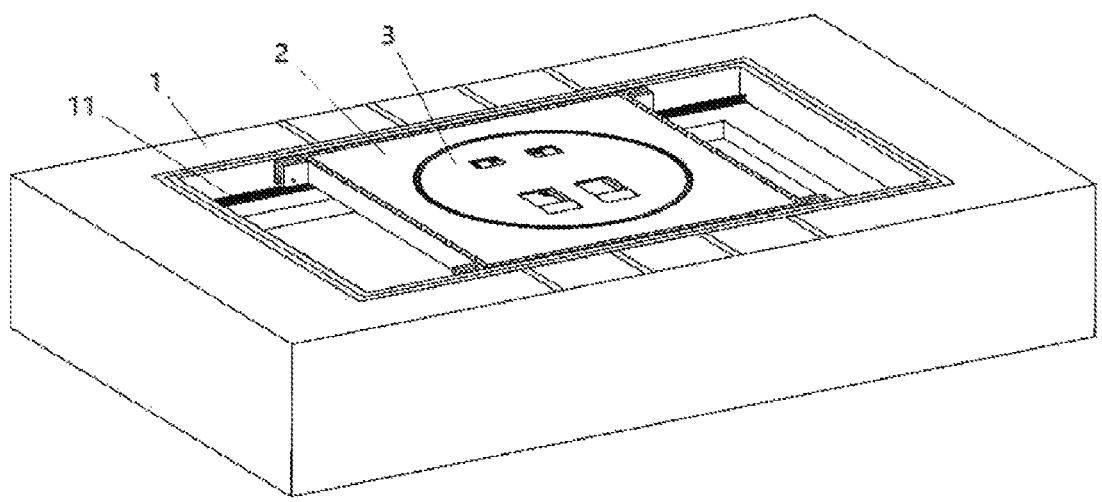
FIG. 1 is the stereogram of the comprehensive performance test system for Automated Driving Vehicles for the first embodiment of the present invention.
Figure 2:
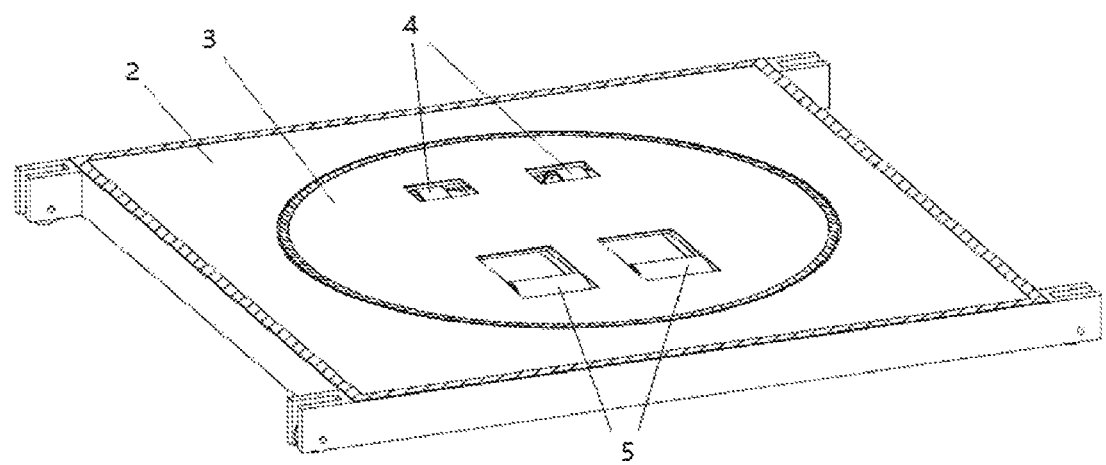
FIG. 2 is the stereogram of the lateral moving platform, the rotary platform in the comprehensive performance test system for Automated Driving Vehicles for the first embodiment of the present invention.
Figure 3:
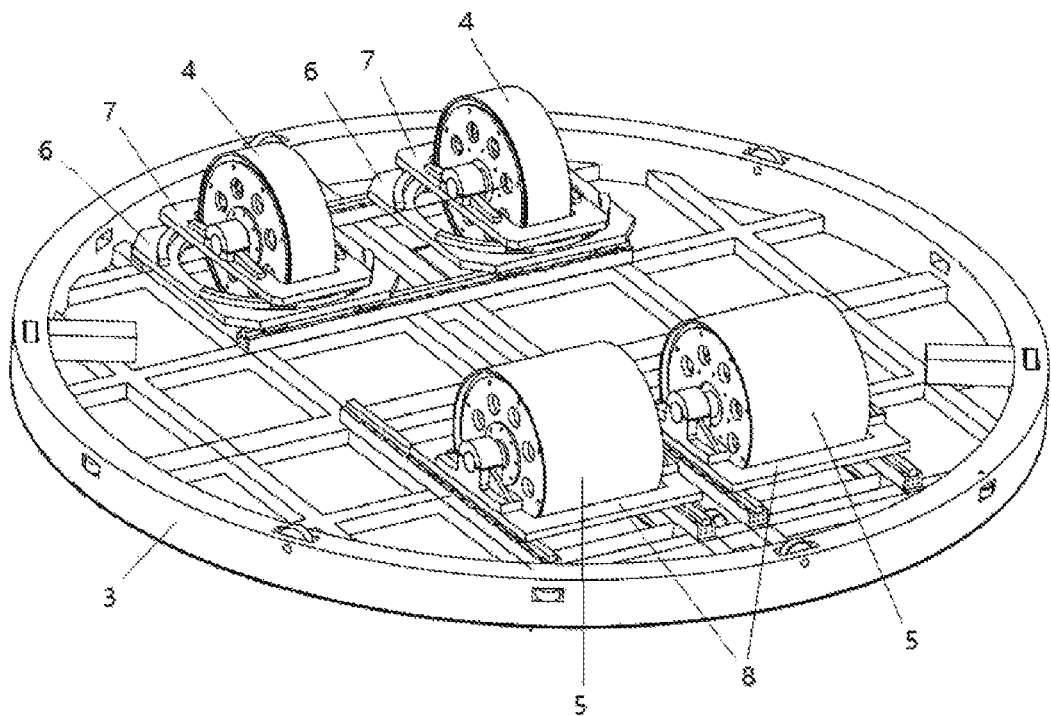
FIG. 3 is the assembly diagram of the rotary platform and a rotary dynamometer in the comprehensive performance test system for Automated Driving Vehicles for the first embodiment of the present invention.
Figure 4:
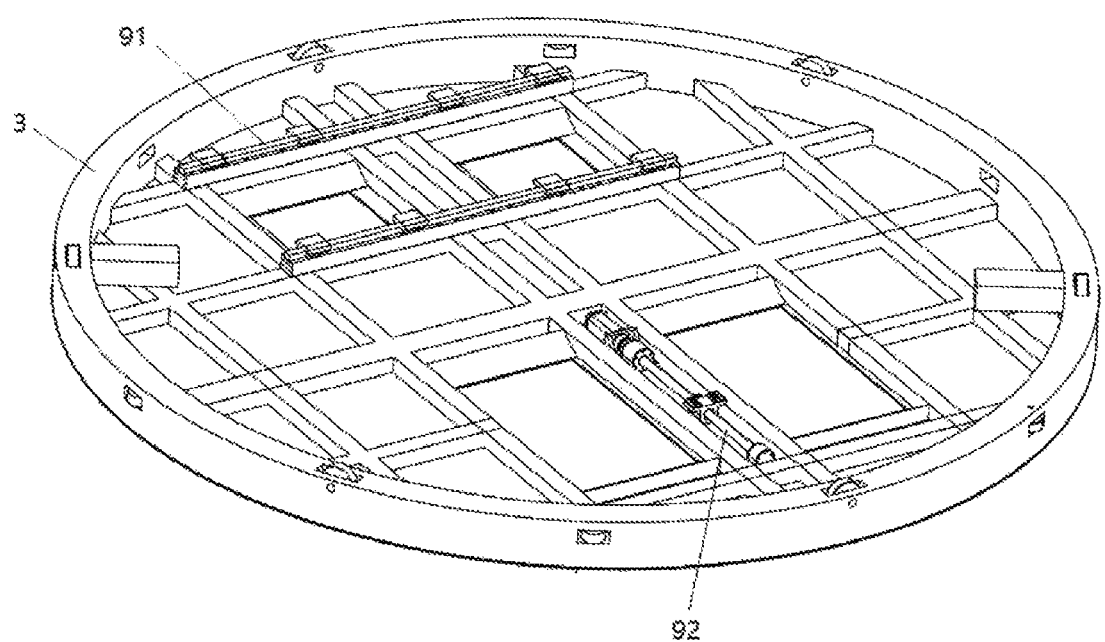
FIG. 4 is the schematic diagram of the internal structure of the rotary platform in the comprehensive performance test system for Automated Driving Vehicles for the first embodiment of the present invention.

The Best Implementation Mode of the Patent Invention

The embodiments of the present invention are described in further detail with the accompanying figures below. But these embodiments are not used to limit the present invention, any similar structure and variation of the present invention adopted shall be included in the protection scope of the present invention. The commas used in the specification represent "and".

As shown in FIG. 1-FIG. 4, the first embodiment of the present invention provides a comprehensive performance test system for Automated Driving Vehicles. comprising: a base platform 1, a lateral moving platform 2 which is mounted on the base platform and can slide left and right on the base platform 1, a rotary platform 3 which is mounted on the lateral moving platform and can rotate horizontally on the lateral moving platform 2.

The base platform 1 as mentioned above is equipped with a guide rail 11 for guiding the left and right sliding of the lateral moving platform 2, and a motor for driving the left and right sliding of the lateral moving platform 2 (not shown in the figure).

The lateral moving platform 2 is equipped with a guide rail for guiding the horizontal rotation of the rotary platform 3 and a motor for driving the horizontal rotation of the rotary platform 3 (not shown in the figure).

There are two front wheels' brackets 6 in the front of the rotary platform which can slide left and right, and two front wheel track adjustment mechanisms 91 to control the movement of left and right sliding of two front wheels' brackets 6; There are two rear wheels' brackets 8 on the rear of the rotary platform which can slide front and back, and two wheelbase adjustment mechanisms 92 to control the movement of front and rear sliding of two rear wheels' brackets 8.

Each front wheel bracket is equipped with a front wheel dynamometer bracket 7 which can rotate horizontally, and each front wheel dynamometer bracket 7 is equipped with a front wheel rotary dynamometer 4, and a load motor for driving the rotation of the front wheel dynamometer 4.

Each rear wheel bracket 8 is equipped with a front wheel dynamometer 5 and load motor for driving the rotation of real wheel rotary dynamometer 5.

The first embodiment of the present invention is used to test Automated Driving Vehicle. According to the structure of the vehicle under test, the distance between the two front wheel rotary dynamometers can be adjusted to fit the distance between the two front wheels of the vehicle, and the distance between the rear wheel rotary dynamometers and front wheel rotary dynamometers can be adjusted to fit the wheel base of the vehicle through the two front wheel track adjustment mechanisms and the two wheelbase adjustment mechanisms. Then the load simulation of the front and rear wheels can be realized by controlling the torque of the front wheel load motor and the rear wheel load motor. When the wheels of the vehicle steering, the front wheel rotary dynamometers can rotate at the same angle as the front wheel, which can keep the front wheel plane of front parallel to that of the front wheel rotary dynamometer, and can control the rotation angle and speed of the vehicle body, as well as the left and right displacement and speed of the lateral moving platform. It can also realize the simulation of the two degrees of freedom steering of front-wheel; four-wheel driving load, body yaw rotation degree of freedom, and body lateral moving degree of freedom simultaneously.

Figure 5:
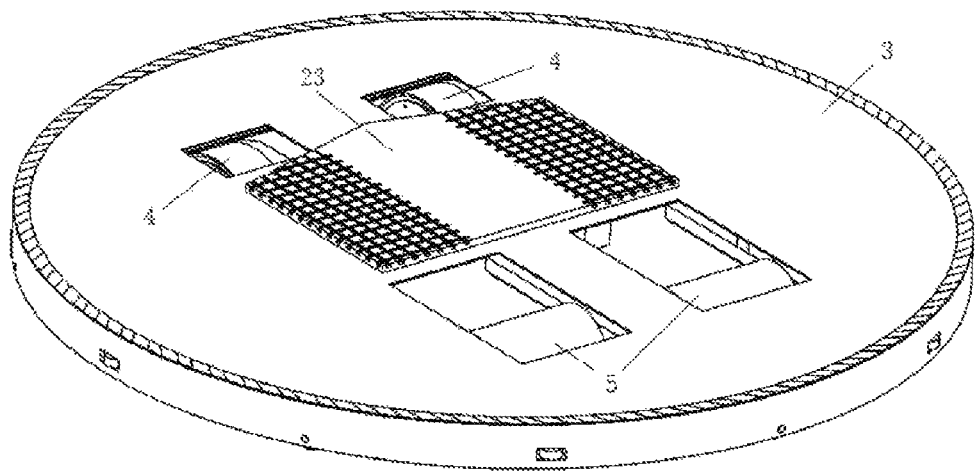
FIG. 5 is the stereogram of the lateral moving platform and the rotary platform in the comprehensive performance test system for Automated Driving Vehicles for the second embodiment of the present invention.
Figure 6:
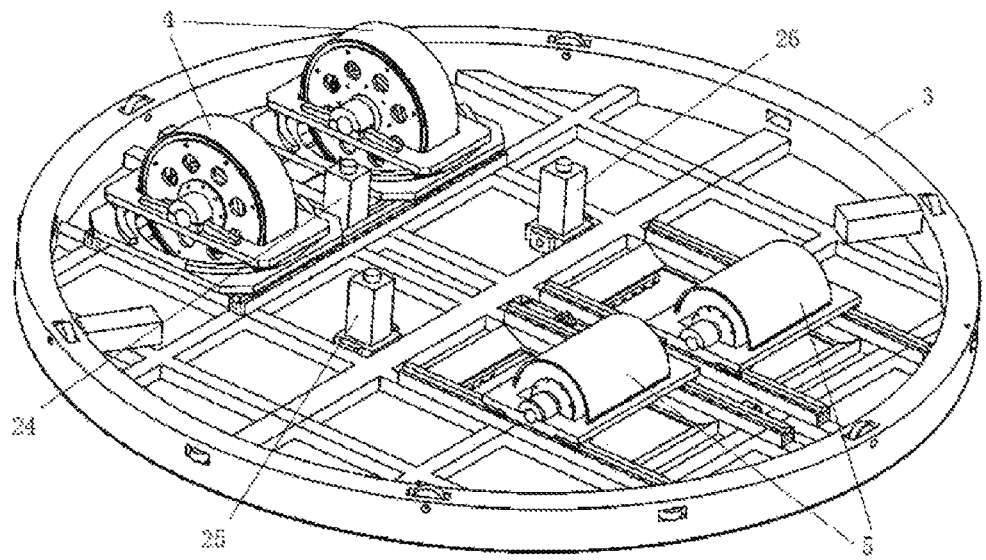
FIG. 6 is the schematic diagram of the internal structure of the rotary platform in the comprehensive performance test system for Automated Driving Vehicles for the second embodiment of the present invention.

As shown in FIG. 5 and FIG. 6, the difference between the second embodiment and the first embodiment of the present invention is that the second embodiment is equipped with a motion platform 23 that can slide up and down on the rotary platform 3. The motion platform 23 is laid between the front wheel rotary dynamometer 4 and the rear wheel rotary dynamometer 5. The rotary platform 3 is equipped with three actuators 24, 25, 26 for driving the upper and lower sliding of the motion platform 23. The three actuators are arranged in triangle.

In the second embodiment of the present invention, when testing, the body of the vehicle will be placed on the motion platform 23, the three actuators can be integrated to control the upper and lower sliding of the motion platform 23, so as to control the roll, pitch and vertical motion of the vehicle, to simulate the vehicle over a bumpy road.

The invention claimed is:
1. A comprehensive performance test system for Automated Driving Vehicles, comprising:
   a base platform,
   a lateral moving platform which is mounted on the base platform and can slide left and right on the base platform, and
   a rotary platform which is mounted on the lateral moving platform and can rotate horizontally on the lateral moving platform, wherein
   the base platform is equipped with
      a guide rail for guiding the left and right sliding of the lateral moving platform, and
      a motor for driving the left and right sliding of the lateral moving platform;
   the lateral moving platform is equipped with
      a guide rail for guiding the horizontal rotation of the rotary platform, and
      a motor for driving the horizontal rotation of the rotary platform; and
   the rotary platform includes
      two front wheel brackets, disposed in the front of the rotary platform, that can slide left and right,
      two front wheel track adjustment mechanisms to control movement of left and right sliding of two front wheel brackets,
      two rear wheel brackets, disposed on the rear of the rotary platform, that can slide front and back, and
      two wheelbase adjustment mechanisms to control movement of front and rear sliding of two rear wheel brackets, wherein
      each front wheel bracket is equipped with a front wheel dynamometer bracket which can rotate horizontally, and each front wheel dynamometer bracket is equipped with a front wheel rotary dynamometer and a load motor for driving rotation of the front wheel rotary dynamometer, and
      each rear wheel bracket is equipped with a rear wheel rotary dynamometer and load motor for driving rotation of the rear wheel rotary dynamometer.

* * * * *